Patented Sept. 29, 1953

2,653,981

UNITED STATES PATENT OFFICE 2,653,981

PROCESS FOR METHYL GROUP SHIFTING OF OLEFIN

John Paul Hogan, Bartlesville, Okla., assignor to Phillips Petroleum Company, a corporation of Delaware No Drawing. Application January 24, 1951, Serial No. 207,650

16 Claims. (Cl. 260—683.2)

This invention relates to hydrocarbon isomerization. In one aspect it relates to the shifting of a methyl group in an aliphatic hydrocarbon molecule. In another aspect, it relates to the shifting of a methyl group in a molecule of a branched-chain mono-olefin having eight to sixteen carbon atoms per molecule. In another aspect, it relates to the conversion of certain methyl-substituted olefinic hydrocarbons to isomeric methyl-substituted olefinic hydrocarbons by contacting, at a temperature in the range of 75° to 175° F., with a catalyst comprising silica, alumina, and an oxide of a metal selected from the group consisting of nickel and cobalt.

A large variety of catalysts is available to the art for isomerizing a straight-chain to a branched-chain hydrocarbon. Likewise, a large variety of catalysts is known for effecting a shift of a double bond in an olefin molecule. The shift of a methyl group in a molecule of a branched-chain paraffin or of a branched chain olefin, however, is rare and requires a special catalyst and closely controlled conditions. Relatively few catalysts are known that specifically promote the shift of a methyl group from one carbon to another in the molecule of a branched-chain olefin. Additional catalysts with improved effectiveness and operating efficiency are therefore desired in the art which is constantly preparing large quantities of isoparaffins and isoolefins which, as will be recognized in the art, can be prepared according to the method of this invention from readily available starting materials.

An object of this invention is to isomerize a hydrocarbon.

Another object of the invention is to isomerize certain branched-chain olefinic hydrocarbons.

Another object is to shift a methyl group from one carbon atom to another in the main carbon chain of the molecule of a monoolefinic hydrocarbon having eight to sixteen carbon atoms per molecule.

A further object is to convert 2,2,3-trimethyl pentenes to 2,3,3- and 2,3,4-trimethyl pentenes.

Other objects and advantages will become evident upon examination of the specification and claims.

In accordance with this invention, methyl-group shifting in the molecule of certain specific olefinic hydrocarbons having eight to sixteen carbon atoms per molecule is effected by contacting said hydrocarbon under isomerizing conditions with a catalyst consisting essentially of a major proportion of silica promoted with minor proportions of alumina and an oxide of a metal selected from the group consisting of nickel and cobalt.

The alumina content of the catalyst may range from 0.1 to 10 weight per cent, preferably 0.5 to 10 weight per cent, and more preferably 0.5 to 5 weight per cent. The nickel oxide content, calculated as elemental nickel, may range from 0.01 to 10 weight per cent, preferably 0.2 to 5 weight per cent. When cobalt oxide is used instead of nickel oxide, the cobalt oxide content (calculated as elemental cobalt) of the catalyst is 0.01 to 4 weight per cent, preferably 0.2 to 3 weight per cent. A preferred catalyst is prepared by depositing nickel nitrate on a coprecipitated silica-alumina gel and igniting the nickel nitrate to nickel oxide. Conventional preparation methods may, however, be used, e. g. mixing silica and alumina gels, impregnating with nickel nitrate and igniting.

The methyl group shifting is conducted by contacting the hydrocarbon feed with the catalyst at 75° to 175° F., preferably 110° to 130° F. Above 175° F. reactions other than methyl group shifting become unduly rapid; below 75° F., the rate of methyl group shifting is undesirably low. The reaction pressure is from about 1 to 50 atmospheres, preferably 5 to 20 atmospheres. The liquid hourly space velocity is 0.2 to 20, preferably 0.5 to 10. The hydrocarbon is preferably maintained in the liquid phase during reaction. Known contacting methods, such as fixed-bed, moving-bed, or suspended catalyst techniques may be used. Products of the reaction are recovered by known methods.

The specific olefins to which this invention applies are $C_8$ to $C_{16}$ olefins having at least three methyl groups as side chains, at least two of said methyl groups being joined to adjacent carbon atoms in the main carbon chain, and in which any quaternary carbon atom the methyl groups of which are to be shifted is adjacent at least one tertiary carbon atom. Thus 2,2,4-trimethyl substituted and 2,2,3,3-tetramethyl substituted olefins are excluded from the scope of the invention. Examples of methyl substituted olefins within the scope of the invention are: 2,2,3-trimethylpentenes, 2,3,3-trimethylhexenes, 2,3,4-trimethylheptenes, 3,4,4-trimethylheptenes, and 3,4,4-trimethyloctenes. Examples of others will be apparent to one skilled in the art from this discussion.

Example

Thirty-nine cc. of trimethylpentenes was diluted with an equal volume of dodecane and contacted for one hour at 110°–130° F. with 15 cc. of a $SiO_2$—$Al_2O_3$—NiO catalyst consisting of 4 weight per cent Ni, 0.5 to 5 weight per cent alumina, and the remainder silica gel. Reactant and product olefin compositions, in volume per cent, are shown in the following tabulation:

|  | Reactant | Product |
| --- | --- | --- |
| 2,2,3-trimethylpentenes | 89 | 77 |
| 2,3,3- and 2,3,4-trimethylpentenes | 7 | 20 |
| 3,4-dimethylhexenes | 4 | 3 |

Substantial methyl group shifting is evidenced by the substantial conversion of 2,2,3-trimethylpentenes to 2,3,3- and 2,3,4-trimethylpentenes shown in the preceding tabulation.

Reasonable variation and modification are possible within the scope of the foregoing disclosure and the appended claims to the invention, the essence of which is that a $C_8$ to $C_{16}$ monoolefinic hydrocarbon having at least three substituent methyl groups, at least two of said methyl groups being joined to adjacent carbons in the main chain, and in which any quaternary carbon atom the methyl groups of which are to be shifted is adjacent to at least one tertiary carbon atom is converted to an isomeric methyl-substituted hydrocarbon by contacting said hydrocarbon at a temperature from 75 to 175° F. with a gel catalyst comprising a major proportion of silica, a minor proportion of alumina, and a minor proportion of an oxide of a metal selected from the group consisting of cobalt and nickel.

I claim:

1. A process for shifting a methyl group in the molecule of a branched-chain olefinic hydrocarbon having from 8 to 16 carbon atoms per molecule, having at least three methyl groups as side chains, at least two of said methyl groups being joined to adjacent carbon atoms in the main chain, and in which any quaternary carbon atom the methyl groups of which are to be shifted is adjacent at least one tertiary carbon atom, which process comprises contacting said hydrocarbon with a catalyst comprising silica gel promoted with 0.1 to 10 weight per cent alumina and 0.01 to 10 weight per cent of an oxide of a metal selected from the group consisting of nickel and cobalt at a temperature in the range of 75° to 175° F., a pressure of 1 to 50 atmospheres and a space velocity of 0.2 to 20 liquid volumes per volume of catalyst per hour.

2. The process of claim 1 in which the temperature is 110° to 130° F., the pressure is 5 to 20 atmospheres, and the liquid hourly space velocity is 0.5 to 10.

3. A process for converting a branched-chain monoolefinic hydrocarbon having from eight to sixteen carbon atoms per molecule, having at least three methyl groups as side chains, at least two of said methyl groups being joined to adjacent carbon atoms in the main chain, and in which any quaternary carbon atom the methyl groups of which are to be shifted is adjacent at least one tertiary carbon atom, to an isomeric, methyl-substituted monoolefinic hydrocarbon, which process comprises contacting said first-mentioned hydrocarbon with a catalyst comprising silica-alumina gel promoted with 0.01 to 4 weight per cent cobalt oxide at a temperature of 75° to 175° F., a pressure of 1 to 50 atmospheres, and a liquid hourly space velocity of 0.2 to 20 and recovering said isomeric hydrocarbon.

4. The process of claim 3 in which the first-mentioned monoolefinic hydrocarbon is a 2,3,3-trimethylhexene.

5. The process of claim 3 in which the first-mentioned monoolefinic hydrocarbon is a 2,3,4-trimethylheptene.

6. The process of claim 3 in which the first-mentioned monoolefinic hydrocarbon is a 3,4,4-trimethylheptene.

7. The process of claim 3 in which the first-mentioned monoolefinic hydrocarbon is a 3,4,4-trimethyloctene.

8. The process of claim 3 in which the temperature is 110° to 130° F., the pressure is 5 to 20 atmospheres, and the liquid hourly space velocity is 0.5 to 10.

9. A process for converting a methyl-substituted, branched-chain monoolefinic hydrocarbon having from 8 to 16 carbon atoms per molecule, having at least three methyl groups as side chains, at least two of said methyl groups being joined to adjacent carbon atoms in the main chain, and in which any quaternary carbon atom the methyl groups of which are to be shifted is adjacent at least one tertiary carbon atom, to an isomeric methyl-substituted monoolefinic hydrocarbon, which comprises contacting said first-mentioned hydrocarbon with a catalyst comprising silica-alumina gel promoted with 0.1 to 10 weight per cent nickel oxide at a temperature of 75° to 175° F., a pressure of 0.2 to 50 atmospheres, and a liquid hourly space velocity of 0.5 to 20, and recovering said isomeric hydrocarbon as a product of the process.

10. A process for the shifting of a methyl group in a hydrocarbon fraction comprising 2,2,3-trimethylpentenes which comprises contacting said fraction with a catalyst comprising silica gel promoted with 0.5 to 10 weight per cent alumina and 0.2 to 5 weight per cent nickel oxide for 1 to 20 hours at a temperature of 75° to 175° F., a pressure of 1 to 50 atmospheres, and a liquid hourly space velocity of 0.2 to 20, and recovering isomeric trimethylpentenes as products.

11. A process for converting a 2,2,3-trimethylpentene to 2,2,3- and 2,3,4-trimethylpentenes which comprises contacting said 2,2,3-trimethylpentene in the liquid phase to a temperature in the range 75 to 175° F. with a catalyst comprising 4 weight per cent nickel oxide, 0.5 to 5 weight per cent alumina, and the remainder silica, and recovering said 2,2,3- and 2,3,4-trimethylpentenes.

12. A process for shifting a methyl group in a 2,2,3-trimethylpentene which comprises contacting said trimethylpentene, in the liquid phase, at a temperature in the range 75 to 175° F., with a catalyst comprising a major portion of silica gel promoted with a minor proportion of alumina and a minor proportion of the oxide of a metal selected from the group consisting of nickel and cobalt.

13. The process of claim 12 in which the catalyst is one prepared by impregnating a coprecipitated silica-alumina gel with the nitrate of a metal selected from the group consisting of nickel and cobalt and igniting to convert the nitrate to the oxide.

14. The process of claim 12 in which the catalyst composition is 0.1 to 10 weight per cent alumina, 0.01 to 10 per cent nickel oxide, and the remainder silica gel.

15. The process of claim 12 in which the temperature is from 110 to 130° F., the pressure is from 1 to 50 atmospheres, the liquid hourly space velocity is from 0.2 to 20, and said trimethylpentene is diluted with an equal volume of dodecane.

16. A process for shifting a substituent methyl group in the molecule of a methyl-substituted olefin hydrocarbon having from 8 to 16 carbon atoms per molecule, said hydrocarbon having at least 3 methyl groups as side chains, at least 2 of said methyl groups being joined to adjacent carbon atoms in the main carbon chain, and in which any quaternary carbon atom the methyl groups of which are to be shifted is adjacent at least one tertiary carbon atom, which process comprises contacting said methyl-substituted olefin hydrocarbon at a temperature in the range 75 to 175° F. with a catalyst comprising a major proportion of silica, a minor proportion of alumina, and a minor proportion of an oxide of a metal selected from the group consisting of nickel and cobalt.

JOHN PAUL HOGAN.

References Cited in the file of this patent

UNITED STATES PATENTS

| Number | Name | Date |
| --- | --- | --- |
| 2,082,801 | Houdry | June 8, 1937 |
| 2,324,762 | Calhoun et al. | July 20, 1943 |
| 2,328,753 | Thomas | Sept. 7, 1943 |
| 2,375,687 | Peterson et al. | May 8, 1945 |
| 2,554,251 | Hudson | May 22, 1951 |

OTHER REFERENCES

Ewell et al., J. Am. Chem. Soc., vol. 63, pages 3460–3465 (1941).